CLARK. M. PLATT.

Improvement in Buttons.

No. 121,000.          Patented Nov. 14, 1871.

Witnesses:
Chas. Nida
H. L. Wattenberg

Inventor:
Clark. M. Platt
per [signature]
Atty

121,001

UNITED STATES PATENT OFFICE.

LEWIN RACINE, OF HILLSDALE, MICHIGAN.

IMPROVEMENT IN STOVE-PIPE DRUMS.

Specification forming part of Letters Patent No. 121,001, dated November 14, 1871.

*To all whom it may concern:*

Be it known that I, LEWIN RACINE, of Hillsdale, in the county of Hillsdale and State of Michigan, have invented a new and Improved Stove-Pipe Heater; and I do hereby declare the following to be a full, clear, and exact description thereof, which will enable others skilled in the art to which my invention appertains to make and use the same, reference being had to the accompanying drawing forming part of this specification, in which—

Figure 1:
Figure 2:
Figure 3:
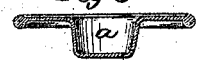
Figure 4:
Figure 5:
Figure 6:
Figure 7:
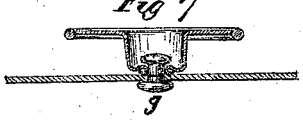
Figure 8:
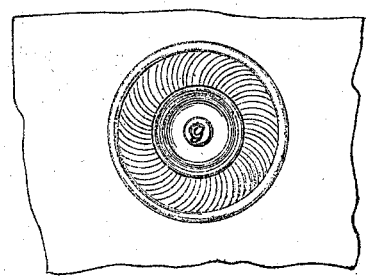

Figure 1 is a side elevation of my invention, and Fig. 2 is a longitudinal cross-section of the same.

Similar letters of reference indicate corresponding parts in the several figures of the drawing.

My invention has for its object to provide a stove-pipe heater or drum which shall be constructed with a much greater heating-surface than those of ordinary construction, by which means a greater proportion of the heat which passes off into the chimney-flues is retained and disseminated throughout the room and used for baking or roasting, when desired; and to this end it consists in a series of circular chambers connected to each other by means of pipes, and having within them dampers to regulate the course of the draught, their number being varied in accordance with the amount of heating surface required. It also consists in an oven or ovens placed between the chambers for baking or roasting provisions, said oven being constructed with an adjustable top, so that it can be made to fill the entire space between the chambers, or a vacuum be left for the circulation of air between them.

In the accompanying drawing, A represents the chambers; B, the pipes connecting them to each other; and C, the oven between the chambers. D represents the shoulders which receive the stove-pipe, and E the rods by which the dampers are regulated. F represents the dampers, which can be moved, by means of the rods, back and forth, their second position being shown by dotted lines, Fig. 2; and G is a wire frame upon which the dampers rest.

Having thus described my invention, what I claim as new, and desire to secure by Letters Patent, is—

Chambers A in combination with pipes B, oven C, dampers F, and frame G, constructed substantially as described, for the purpose specified.

LEWIN RACINE.

Witnesses:
  G. H. FROST,
  J. G. SMITH. (154)